Nov. 24, 1925. 1,562,520

F. C. RUPPEL

PROCESS FOR MOLDING PLASTIC BODIES

Filed Sept. 10, 1923

INVENTOR.

BY Frederick C. Ruppel

Edward N. Pagelsen
ATTORNEY.

Patented Nov. 24, 1925.

1,562,520

UNITED STATES PATENT OFFICE.

FREDERICK C. RUPPEL, OF GRAND RAPIDS, MICHIGAN, ASSIGNOR TO HAYES PRODUCTS COMPANY, OF GRAND HAVEN, MICHIGAN, A CORPORATION OF MICHIGAN.

PROCESS FOR MOLDING PLASTIC BODIES.

Application filed September 10, 1923. Serial No. 661,782.

*To all whom it may concern:*

Be it known that I, FREDERICK C. RUPPEL, a citizen of the United States, and residing at Grand Rapids, in the county of Kent and State of Michigan, have invented a new and Improved Process for Molding Plastic Bodies, of which the following is a specification.

This invention relates to the process of forming bodies of concrete, plaster of Paris and other plastic materials in such a manner that the exterior surfaces thereof shall be smooth and free from air holes, and consists in placing a plastic mass in a mold and then vibrating or percussing the mold and the material therein to assist the air bubbles in the plastic mass to rise therein, especially from the lower surface thereof.

It further consists in then permitting the plastic material to harden sufficiently to prevent air bubbles moving in the mass, then filling the mold and inverting it and vibrating or percussing it to assist the air bubbles in the later plastic mass to pass inward from the exterior surface thereof.

Figure 1:
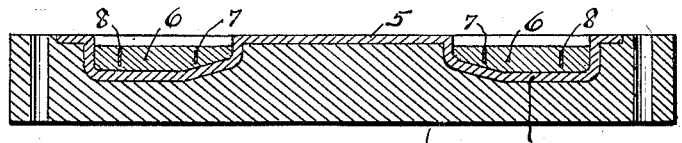
Figure 2:
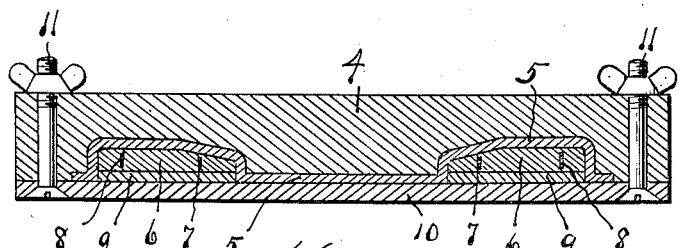
Figure 3:
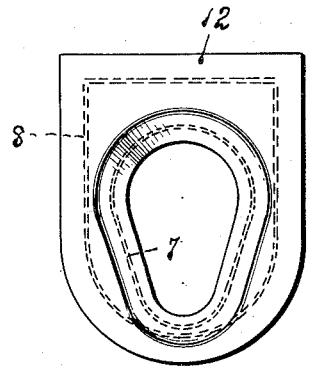
Figure 4:
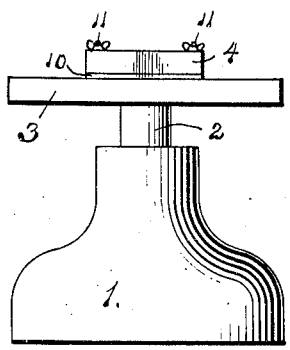

In the accompanying drawing, Fig. 1 is a transverse section of a mold and a quantity of plastic material therein. Fig. 2 is a similar view of this mold after a second quantity of plastic material has been filled in and the mold has been closed and inverted. Fig. 3 is a plan of a molded plastic block, in this case a toilet seat. Fig. 4 is an elevation of a machine adapted to vibrate or percuss the mold and a mold on the table thereof.

Similar reference characters refer to like parts throughout the several views.

While any desired means may be used to vibrate the molds employed in the present process, I have found the ordinary percussion sand-molding machine which is used in iron foundries to be very satisfactory. It consists generally of a base 1 in which a ram 2 is caused to rapidly move up and down, the ram being stopped suddenly by striking a rigid body at the end of its downward movement. On the ram is a table 3 which receives the mold.

In Figs. 1 and 2 I have shown a block 4 having a lining 5, preferably of celluloid, which constitutes the mold. By "celluloid" I mean any of the nitro-cellulose plastics which are known as "celluloid", "pyralin", "fiberoid", "xylonite", etc. The plastic material which I have found best adapted for forming toilet seats and covers is a mixture of oxychloride of zinc or magnesium and particles of cork ranging in size from those which just pass a quarter inch screen to flour. As this expands slightly in setting, a resilient and flexible mold is desirable, and I have found celluloid to answer the purpose as it can easily be formed and can be freed from fatigue by heating in boiling water. It has a further advantage of producing a glassy surface on the plastic mass. It is to be understood, however, that the block 4 may be entirely omitted when desired as satisfactory bodies can be produced by using the celluloid alone.

Plastic material 6 is placed in the mold, embedding reinforcing ribbons 7 and 8 if desired. The mold is then placed on the table 3 and vibrated or percussed to free the air bubbles which are in the plastic mass along its lower surface and cause them to rise therefrom. This removal of the air is so complete that the surface of the plastic material after it has set in the celluloid mold is glassy, no pits or lines being visible. The mold may now be set aside until the plastic material hardens.

But if the plastic body is to be finished on all sides, the mold is set aside for a few hours after this percussion, or until the plastic mass has partially hardened, when the mold is filled with a second layer 9 of the same plastic mass. This hardening must not pass the point where the layer 9 refuses to unite with the layer 6. A cover board 10 may be secured in position by the bolts 11, but it will usually be found that a flat cover board need not be secured. The mold is then inverted and placed on the table 3 and again percussed to drive inward the air bubbles from the outer surface of the layer 9. As the layer 6 is already sufficiently hard to resist the passage of these air bubbles, they remain in the interior of the finished block.

While I have shown a mold especially adapted to form the toilet seats 12 shown in Fig. 3, the process is not limited thereto as bodies of any other desired form can be produced by this process so long as the molds therefor will permit of being percussed. When the plastic bodies have hardened, they, together with the molds 5, are lifted from the blocks 4, if blocks are used, after which the molds are sprung from the plastic blocks. I have found that there is hardly any adhesion between plastic bodies of this character and celluloid so that this mold can be easily removed.

The details of the molds and the time required for percussing and initial setting will vary with each particular body to be produced and the composition of the plastic mass, but a period of ten minutes should be sufficient to cause the removal of the air bubbles from the surface of practically all plastic masses.

I claim:—

The process of producing plastic bodies which consists in partially filling a mold with a plastic mass, percussing the mold and the mass therein to cause the air bubbles in the mass to rise from that portion of the surface thereof which is in contact with the mold, then permitting the plastic mass to take an initial set, then filling the mold with plastic material, covering and inverting the mold and then percussing the mold and the mass therein to cause the air bubbles in the last filled-in mass to rise from that portion of the surface thereof which is in contact with the mold and cover, and then permitting the plastic mass to harden.

FREDERICK C. RUPPEL.